United States Patent [19]

Mertens et al.

[11] Patent Number: 5,251,214
[45] Date of Patent: Oct. 5, 1993

[54] METHOD FOR TRANSMITTING DATA TO A PLURALITY OF DATA STATIONS

[75] Inventors: Klaus-Dieter Mertens, Paderborn-Elsen; Klaus Becker, Berlin; Thomas Wolfbeisz, Berlin; Rainer Goetsch, Berlin, all of Fed. Rep. of Germany

[73] Assignee: Siemens Nixdorf Informationssysteme A.G., Fed. Rep. of Germany

[21] Appl. No.: 867,525

[22] Filed: Apr. 13, 1992

[30] Foreign Application Priority Data

Apr. 17, 1991 [EP] European Pat. Off. ......... 91106117.4

[51] Int. Cl.$^5$ .......................... H04J 3/24; H04L 12/40
[52] U.S. Cl. ..................... 370/92; 370/85.1; 340/825.52; 371/32; 371/53
[58] Field of Search ............... 370/85.8, 92, 93, 94.1, 370/95.2, 60, 85.1; 340/825.07, 825.08, 825.52, 825.53, 825.54; 371/32, 33, 48, 53

[56] References Cited

U.S. PATENT DOCUMENTS

| | | | |
|---|---|---|---|
| 4,760,572 | 7/1988 | Tomikawa | 370/94.1 |
| 4,896,151 | 1/1990 | Kuranami et al. | 371/32 |
| 4,998,245 | 3/1991 | Tanaka et al. | 370/94.1 |
| 5,030,948 | 7/1991 | Rush | 340/825.53 |

Primary Examiner—Douglas W. Olms
Assistant Examiner—Hassan Kizou
Attorney, Agent, or Firm—Hill, Steadman & Simpson

[57] ABSTRACT

In a method for transmitting data from a central station to a plurality of data stations via a multipoint connection according to a prescribed transmission protocol, every data station has an address allocated to it under which it receives data and outputs messages to the central station. When at least two data stations request data from the central station, the central station (Z) selects one of the data stations that request data and communicates the address of the selected data station (K1) to the further data station (K2, K3, Kn). In response thereto, the latter modifies its address to the address of the selected data station (K1). The central station (Z) transmits data to the selected data station (K1) that is also received by the further data station (K2, K3, Kn), whereby the transmission protocol is only processed between the central station (Z) and the selected data station (K1) during the data transmission. After the conclusion of the data transmission, the further data station (K2, K3, Kn) resets its address.

19 Claims, 8 Drawing Sheets

FIG 5b

METHOD FOR TRANSMITTING DATA TO A PLURALITY OF DATA STATIONS

BACKGROUND OF THE INVENTION

The present invention is directed to a method for transmitting data from a central station to a plurality of data stations via a multipoint connection according to a prescribed transmission protocol, whereby every data station has an address allocated to it under which it receives data and outputs messages to the central station, and whereby at least two data stations request data from the central station.

Such a method, for example, can be employed in a cash register system, whereby a master computer in a central station administers operating programs and application programs that are stored as data in a memory and also administers data in the form of price lists. This data must be sent to the data stations, that are cash registers, at specific time intervals and at their request, for example upon daily activation or when cash registers are changed. The data is transmitted between the central station and the data stations via a multipoint connection. This allows all data stations to have the data, that is transmitted from the central station, available nearly simultaneously. Of the offered data, the individual data stations only accept the data that is provided with their respective address. The execution of the overall data transmission is defined by an algorithm that is referred to as transmission protocol. This contains declarations about the code, the operating mode, time criteria, etc., that are to be taken into consideration in the transmission of the data. The acknowledgement data, behavior given errors during transmission, the repeated transmission of data, start and end of the data transmission, etc., are also defined in the transmission protocol.

The method set forth above is disclosed in, for example, German reference DE 37 36 550 C2. In this method, a central station simultaneously transmits the data to all data stations that have requested data by means of a radio broadcast transmission. During the data transmission, the individual data stations store the acknowledgement data required according to the transmission protocol and with which the proper reception of the data is acknowledged in an allocated memory. After the end of the data transmission, the stored data is successively transmitted to the central station. Thus, in the known method, a determination as to whether the transmission wa faulty and must be potentially repeated for individual data or data blocks can only be made after the end of the transmission of the useful data, i.e. the data requested from the central station. When an error then occurs in the initial phase of the data transmission on the connection between the central station and the data stations, then all requested data must first be transmitted before a determination can be made after the end of the transmission of the useful data as to whether such a transmission error is present. Even though only one data block may possibly have been incorrectly transmitted, this can nonetheless mean that the entire data transmission from the appearance of the error must be again undertaken. Thus, in the case of transmission errors, the known method is extremely sensitive to a high time-consumption for the data transmission.

A further problem in the known method is that all data stations must transmit their intermediately stored acknowledgement data to the central station after the end of the data transmission. The time required for this purpose must be fundamentally included with the time required for the transmission of the useful data because the data that has arrived at the data stations can only be used when it is guaranteed that the transmission was fault-free. The transmission of acknowledgement data to the central station required for every data station therefore disadvantageously lengthens the overall time of the data transmission.

SUMMARY OF THE INVENTION

It is an object of the present invention to provide a method with which it is possible to implement the transmission of data from a central station to a plurality of data stations with reduced time outlay.

This object is achieved in that the central station selects on of the data stations requesting the data and communicates the address of the selected data station to the other data station or stations; in that the latter changes its address to the address of the selected data station in response thereto; in that the central station transmits data to the selected data station, this data also being received by the other data station, whereby the transmission protocol is processed only between the central station and the selected data station during the data transmission; and in that the other data station resets its address after the end of the data transmission.

The present invention is based on the perception that transmission errors have a high probability of being attributed to errors that arise during the transmission on the transmission link between the central station and the data stations. For example, such errors can arise due to inductive or capacitive coupling of current or voltage pulses on the often long transmission lines between the central stations and the data stations. These errors belong to the category of random errors. Other frequent errors belong to the category of systematic errors that, for example, arise due to software in the central station when editing the data for transmission or due to hardware in the electronic further processing of the data. By contrast thereto, transmission errors on the part of the data stations are rarer since the transmission paths are generally short there and less electronic outlay must be involved upon reception of the data.

The present invention then proceeds from the consideration that it is adequate for the reliable recognition of the most frequency transmission errors to process the transmission protocol during the data transmission only in interaction with a single data station. According to the present invention, the central station selects one of the data stations requiring the data and communicates only with this data station during the transmission of the data. All other data stations requesting data participate only passively in the communication. Due to the processing of the transmission protocol, the above-addressed, most frequent transmission errors can be recognized and appropriate action can be undertaken. Given faulty reception of individual data or data blocks, it is thus possible to again transmit the data from the central station. Differing from the prior art, the data transmission thus need not be initially carried out to the end for all requested data; rather, a reaction with the appropriate counter-measure is immediately made in response to a transmission error. In case of an error, it thereby becomes possible to keep low the time outlay for the overall data transmission that cover both the time for the transmission of the useful data, as well as, the time for the transmission of the messages and data according to the transmission protocol A further time-saving results in that the received useful data is immediately acknowledged by the selected data station during the processing of the transmission protocol. It is thus not necessary to provide a reserve time between the transmission of individual data o data blocks in order to guarantee the reliable reception at the data stations.

The other data station receives the data transmitted to the selected data station in that it modifies its transmission means to the address of the selected data station. It becomes possible on the basis of this simple but effective measure that the data transmitted from the central station is simultaneously received by a plurality of data stations. Since the further data station does not transmit any acknowledgement data according to the transmission protocol, i.e. this acknowledgement data is eliminated, the overall time for the data transmission is shortened by the corresponding amount. Thus, in the method of the present invention, a short data transmission time upon retention of a high reliability of the data transmission is achieved by the combination of data transmission upon observation of the rules according to the transmission protocol with the simultaneously transmission of data to further data stations on the basis of address modification.

The measures of the present invention can be realized according to the layer model (OSI reference model) for the transmission of data in a higher layer level. The transmission protocol provided for the data transmission thereby remains unaffected. The method of the present invention can therefore be employed without major adaptation problems for existing data networks.

An especially advantageous embodiment of the present invention is characterized in that the central station collects the requests for data transmitted from the data stations, that it forms groups from these data stations and selects one data station for each group, and that the transmission of the data occurs group-by-group.

As a result of these measures, it becomes possible to respond very flexibly to the different transmission requests of the various data stations. This thereby takes the fact into consideration that an accumulation of identical requests exists given identical data stations, these initiating the data stations to request the same data from the central station.

Advantageously, these requests for data from the data stations are collected for a given time. Only after this time has expired does the central station determine the selected data station. What is thereby achieved is that the data transmission occurs according to a given time grid and can thus be more time-efficiently implemented since a greater number of data stations can be simultaneously serviced.

Expediently, the time span for collecting the requests for data output by the data stations is equal to or less than 10 seconds. As a result thereof, the demand for fast data access by the data stations is taken into consideration and, in addition, a great number of data stations can participate in the data transmission.

A further development of the present invention is characterized in that groups of data stations having an identical maximum data block length of the reception data buffer are formed. This data block length essentially defines the transmission speed of the requested data. What is guaranteed by these measures is that the overall time for the data transmission becomes minimal.

Another development of the present invention provides that groups of data stations having the same requested data are formed. As a result of this measure, the data set to be transmitted is exactly matched to the requested data set. The data memory of the respective data station is thus optimally exploited.

In a further development of the present invention, the method can be realized such that the data transmission occurs according to a time-division multiplex method for a plurality of groups of data stations that request data from the central station. As a result of the time-interleaved transmission of data, the data transmission rate between the central station and the respective group is in fact reduced. However, what is achieved is that the data transmission for each group is ended at approximately the same time. For applications wherein a plurality of data stations must be simultaneously accessed, this is advantageous because the data is available in the individual data stations at nearly the same point in time.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
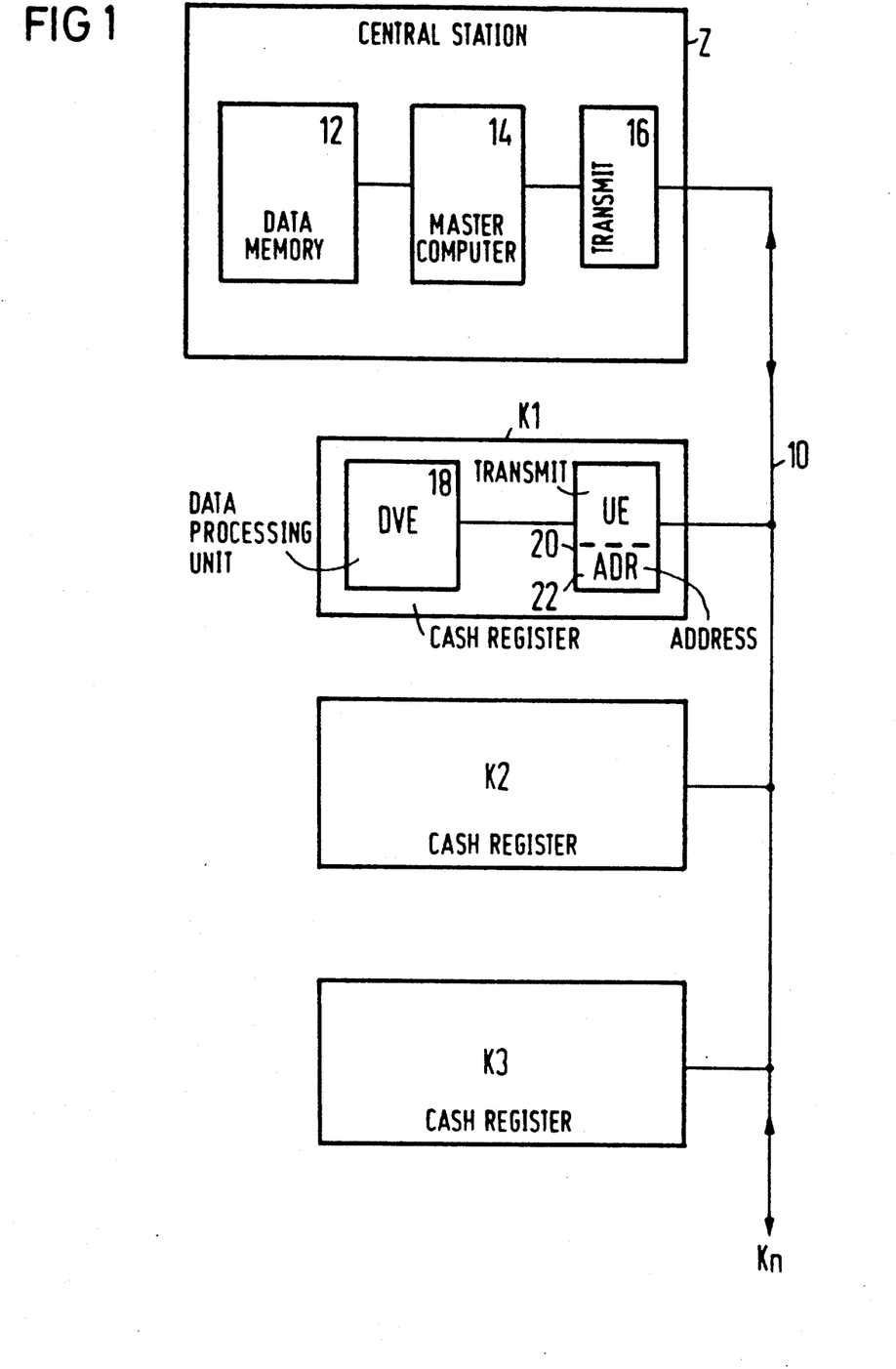
FIG. 1 is a block diagram of a structure of a cash register system wherein a plurality of data stations are cash registers.

FIG. 1 shows a cash register system that has a bus structure and, for example, can be used in a department store. A data bus 10 that has the capability of setting up multi-point connections connects a central station Z and cash registers K1, K2 and K3 to one another. The bus 10 assumes a passive data transport and further cash registers Kn can be connected to it. In larger department store configurations, for example, approximately 100 cash registers are connected to the bus 10.

The central station Z has a transmission means 16 that establishes the connection between the data bus 10 and a master computer 14. The transmission means 16 contains a signal converter that undertakes the matching of the data to be transmitted to the properties of the data bus 10, as well as, the conversion of the received signals into a form prescribed for the computer 14. Further, the transmission means 16 contains a mode adaptor that controls the set-up and clear-down of data connections. The master computer 14 is connected to a data memory 12 in which operating programs, application programs and data is stored. For example, such data are price lists that must be often changed and centrally administered.

With respect to the data transmission, the cash registers K1 through Kn have an identical structure that shall be set forth in detail with reference to the cash register K1. The cash register K1 is connected to the data bus 10 via a transmission means 20. The transmission means 20 has basically the same structure as the transmission means 16 of the central station Z. The transmission means 20 has an address area 22 that contains an address under which the transmission means 20 receives or, respectively, transmits data. This address thus serves as source address or, respectively, as destination address for the data. The transmission means 20 is connected to a data processing unit 18 that performs the computer operation for the cash register K1. The data processing unit 18 has access to a memory (not shown) that stores the received data.

The data transmission is implemented upon employment of the HDLC protocol (high level data link control procedure). This transmission protocol can be advantageously utilized here since it has a uniform format, is independent of a code due to its bit orientation, allows high utilization of the transmission channel and, finally, has a modular structure.

The transmission means 20 has the capability of modifying its address in the address area 22 during operation. The data processing unit 18 undertakes this modification program-controlled. As a result thereof, it is possible that the cash register K1 also receives data that is not intended for it but has been provided with a different destination address by the central station Z. The structure of the cash registers K2, K3 through Kn relevant for the data transmission essentially corresponds to that of the cash register K1, so that this need not be set forth in greater detail here.

After a cash register is turned on, for example the cash register K1, a request for data transmission is usually sent to the central station Z in order to load an operating program for the operation of the cash register K1 or a current price list. For example, such requests for data are more frequently received at the beginning of daily operation in a defined time span at the central station Z. The latter collects the requests for a given time that should amount to approximately 10 seconds and forms groups of cash registers that have requested the same operating programs, application programs or price data. Let it be assumed below that the cash registers K1, K2 and K3 among a plurality of N cash registers that request data from the central station Z request the same data, so that the central station Z combines the cash registers K1, K2, and K3 to form a group. According to the present invention, the central station Z now selects one of the cash registers K1, K2, and K3, for example the cash register K1. The address thereof is communicated to the cash registers K2 and K3 by the central station Z. On the basis of their data processing units, these cause the address in the respective transmission unit to be set to the address of the cash register K1. Subsequently, the central station Z transmits the data that are provided with the destination address of the cash register K1 to the cash register K1. The HDLC transmission protocol is only processed between the central station Z and the cash register K1 in this phase, this to be set forth in yet greater detail later. This means that only the cash register K1 sends acknowledgement data o commands back to the central station Z after reception of data blocks. The other cash registers K2 and K3 of the group formed by the central station receive the data in purely passive fashion under their modified addresses and do not make any answerbacks to the central station Z. The group of cash registers K1, K2 and K3 thus forms a masterslave system wherein the cash register K1 is the master and the cash registers K2, K3 are slaves. As master, cash register K1 quasi-assumes the job of data control under the HDLC transmission protocol for the slaves, i.e. for the cash registers K2, K3. This is possible because the cash registers K1, K2 and K3 have the same transmission behavior and the transmission rules declared for the master such as, for example, the definition of the time intervals for the acknowledgements, the sequential control for the transmission of the useful data, etc., are also valid for the slaves.

After the conclusion of the data transmission from the central station Z to the cash register K1 and, thus, indirectly to the cash registers K2, K3 as well, the cash registers K2, K3 reset their address, so that they can communicate with the central station Z in a point-to-point connection.

Figure 2:
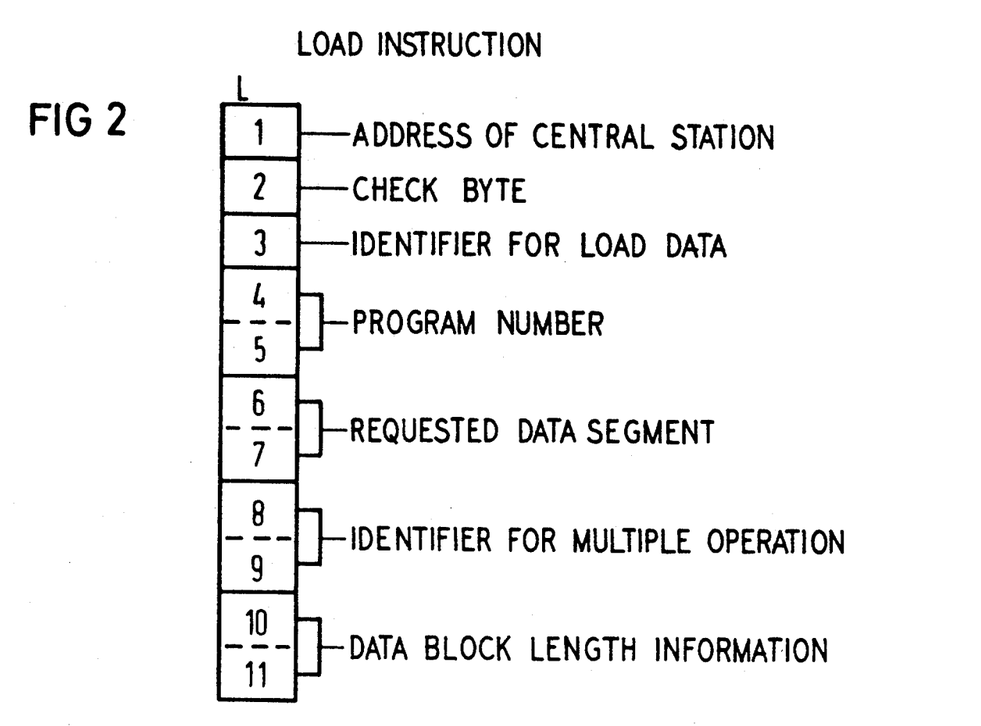
FIG. 2 depicts the byte-by-byte structure of the load instructions with which the cash registers request data from the central station.

FIG. 2 shows the byte-by-byte structure of a load instruction L with which the cash registers K1 through Kn can request data from the central station Z. The first byte of the load instruction L contains an HDCL address to which the load instruction L is directed, i.e. the address of the central station Z. The second byte is referred to as HDLC check byte. According to the HDLC rules, it contains the format of the transmitted instruction (information frame) as well as transmission and reception sequence counters. The third byte contains an identifier for load data. This identifier defines the data source from which data is loaded into the requesting cash register. The bytes 4 and 5 contain the program number under which the program to be loaded or the data to be loaded is deposited in the memory 12 of the central station Z. This data is generally segmented. The bytes 6 and 7 identify the requested program part or, respectively, the data segment.

The bytes 8 and 9 contain an identifier for the multiple operation, i.e. whether the appertaining cash register is designed for the simultaneous reception of data. Using this identifier, the central station Z can decide whether the appertaining cash register can be involved in a group for which a simultaneous data transmission is provided. The bytes 10 and 11 contain information about the data block length of the reception data buffer of the cash register K1 through Kn transmitting the load instruction L. Typical data block lengths are 128, 256, 512 and 1024 bytes.

Figure 3:
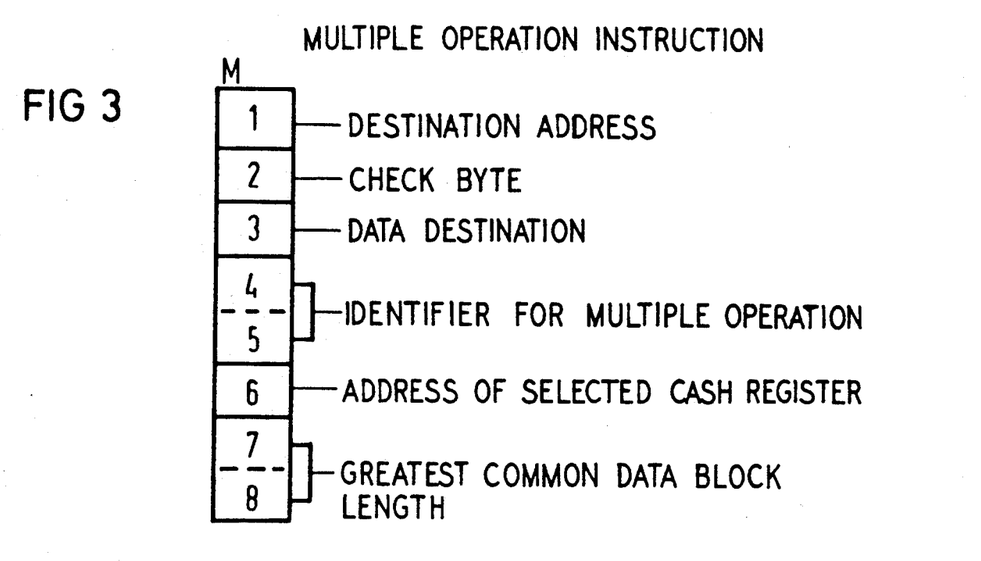
FIG. 3 depicts the byte-by-byte structure of the multiple operation instruction with which the central station sets the cash registers to multiple operation.

FIG. 3 shows the byte-by-byte structure of a multiple operation instruction M. This instruction is transmitted from the central station Z to the cash registers K1, K2 and K3 that the central station Z combines to form a group and that are supplied with data in multiple operation or simultaneous operation. The first byte of the multiple operation instruction M contains its destination address, i.e. one of the addresses of the cash registers K1, K2 or K3. The second byte contains the HDLC check byte that defines the format of the transmitted instruction under the HDLC rules. The data destination to which the data should proceed in the transmission is defined at the addressed cash registers K1, K2 or K3 with the value of the third byte. The bytes 4 and 5 contain an identifier for the multiple operation. This identifier triggers the functions at the cash registers K1, K2 and K3 receiving the multiple operation instruction M that ar required for the simultaneously reception of data. The sixth byte contains the address of the selected cash register or of the master cash register, i.e. the address of the cash register K1 according to the example of FIG. 1. The bytes 7 and 8 contain the greatest common block length that the central station Z has identified by evaluating the possible data block lengths contained in the bytes 10 and 11 of the load instruction L. The use of the largest common block length provides an even faster data transmission in multiple operation.

Figure 4:
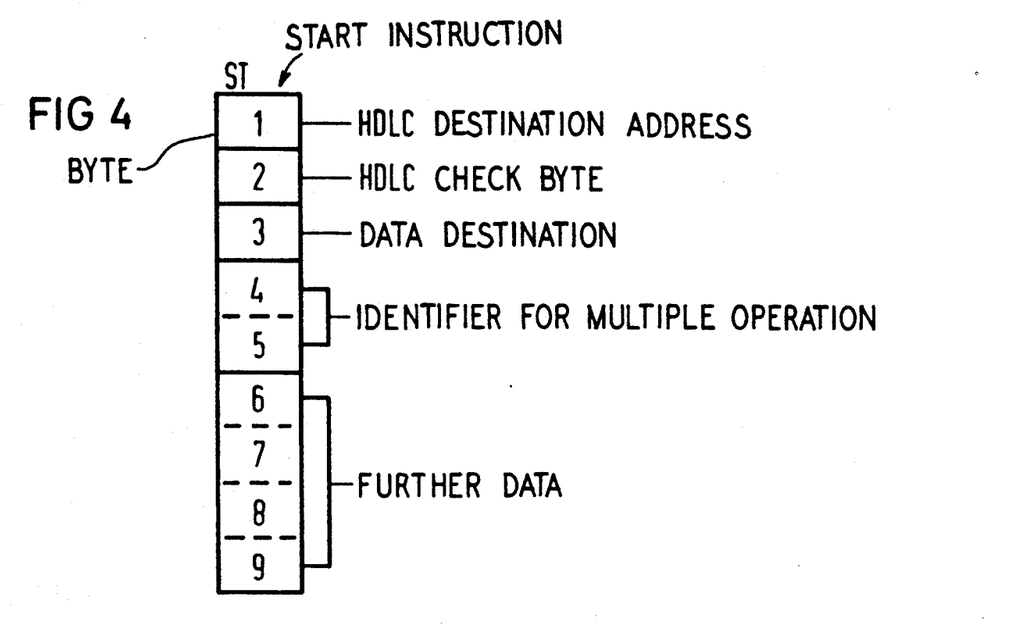
FIG. 4 depicts the byte-by-byte structure of the start instruction with which the simultaneous data transmission by the central station is started.

FIG. 4 shows the byte-by-byte structure of a start instruction ST that the central station Z transmits to the selected cash register K1 of the simultaneous data transmission. With respect to bytes 1 through 4, this instruction is constructed in exactly the same way as the multiple operation instruction M. The bytes 6 through 9 contain further useful data such as, for example, the name of the program that is sent to the cash registers K1, K2 and K3.

The ST instruction serves for the synchronization of the individual data cash registers; it is simultaneously received and interpreted by all. With it, the variable waiting time for collecting the requests, for example 10 seconds, is ended. Moreover, the current transmission and reception block counters are accepted from the slave cash register. Just like the other transmission blocks, the ST instruction is only answered by the cash register K1 that serves as master cash register.

Figure 5A:
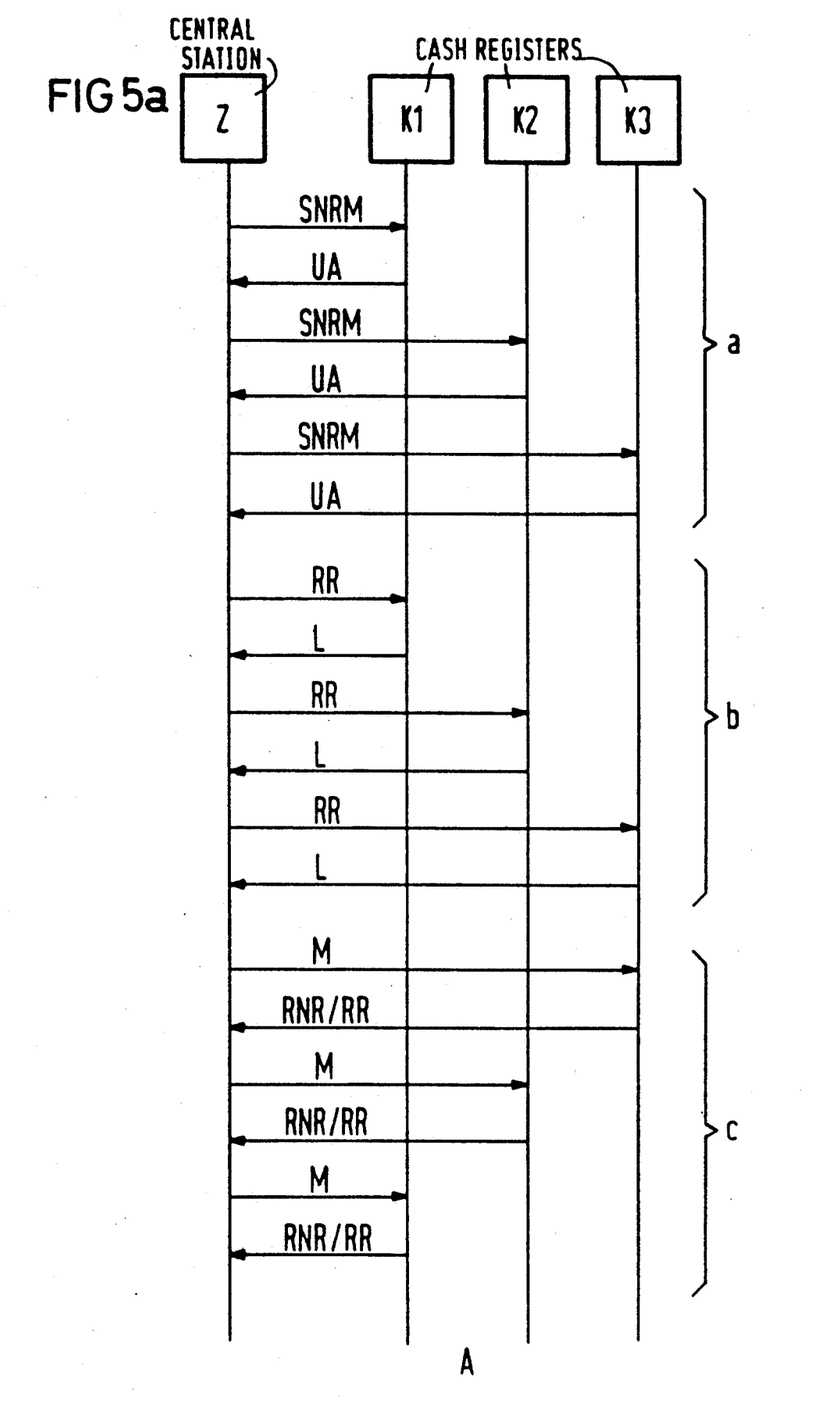
FIGS. 5a through 5c depict a flowchart wherein the execution of the data transmission upon processing of the HDLC protocol is schematically shown.
Figure 5B:
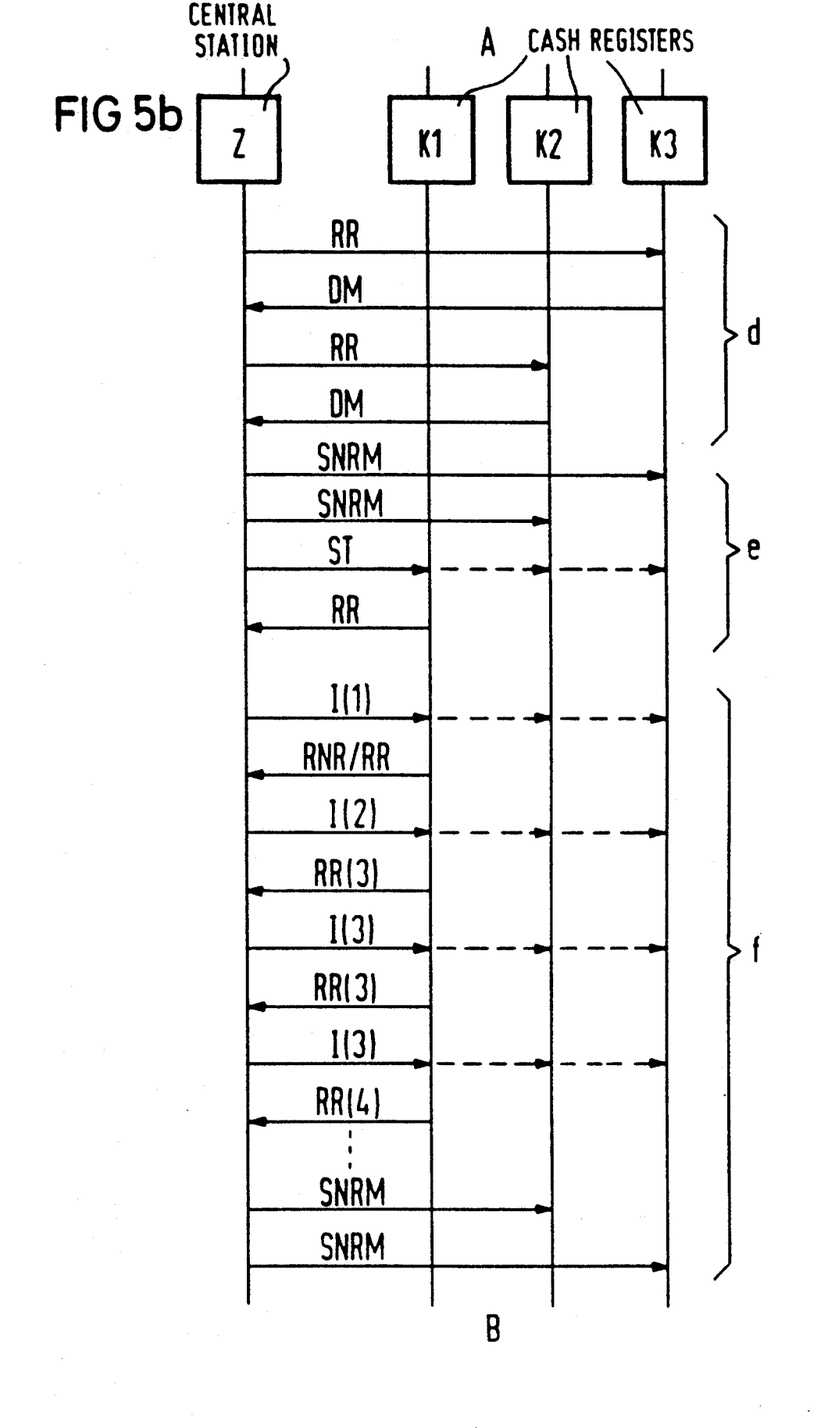
Figure 5C:
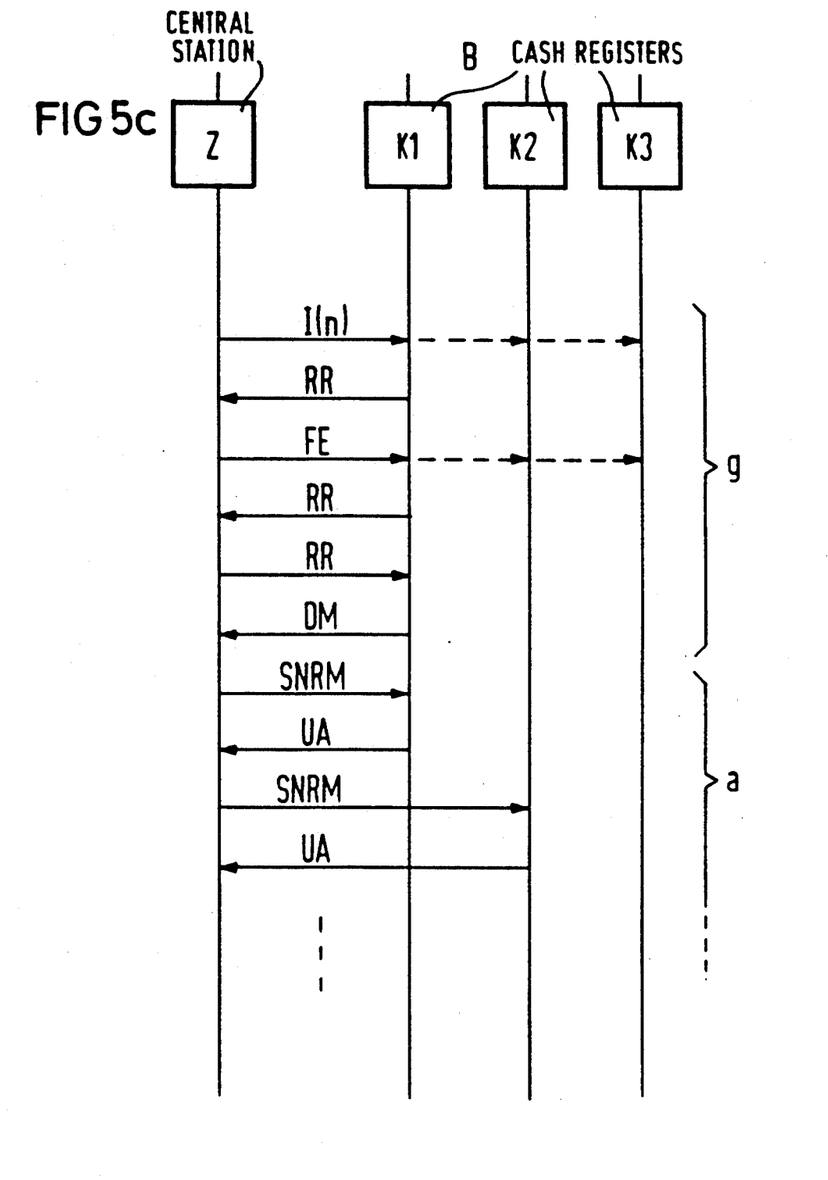

FIGS. 5a, b, c schematically show a flowchart of the data traffic in the data transmission between the central station Z and the cash registers K1, K2 and K3. The execution is divided into various sections a through g. The data transmission is implemented according to the HDLC transmission protocol in what is referred to as NRM request operation (NRM=normal response mode). This means that the cash registers K1, K2 and K3 can only send data or answerbacks when they have been requested to do so by the central station Z. The central station Z must thus interrogate the individual cash registers K1 through K3 with corresponding instructions to see whether they wish to output a message.

In section a, the central station Z collects the requests for data output by the cash registers K1 through K3. To this end, the central station first transmits a SNRM instruction (set normal response mode) to the cash register K1. With this instruction, the addressed cash register K1 is requested to begin the request operation. The cash register K1 confirms the acceptance of the SNRM instruction with a UA message (UA=unnumbered acknowledge). This message indicates that the cash register K1 has set up a logical connection to the central station Z. The corresponding procedure is carried out in section a with the cash registers K2 and K3. After traversing the section a, a respective logical data connection is set up between the central station Z and the cash registers K1, K2 and K3.

In the next section b, the central station Z sends a RR instruction (RR=receive ready) to the cash register K1. This instruction is used to communicate the readiness for reception of a data transmission block to the addressed remote station. In response thereto, the addressed cash register K1 transmits a load instruction L with which it requests the central station Z to send specific data, for example an operating program, an application program or a current price list. The central station Z proceeds correspondingly with the cash registers K2, K3. After the end of the section b, the central station Z is informed about the load requests of the cash registers K1, K2 and K3. According to the requested data, the identifier for multiple operation of the cash registers K1 through K3, as well as, their possible reception block length, the central station Z can combine the cash registers K1 through K3 to form a group for which a data transmission in multiple operation is possible. The central station Z then selects, for example, the cash register K1 as a master cash register and with which it will implement the data transmission while processing the transmission protocol.

In section c, the central station Z sends the multiple operation instruction M to the cash register K3, informing the cash register K3 about the intended, simultaneous data transmission. It also sends the address of the master cash register, i.e. of the cash register K1 as well as the block length with which the data transmission is to be implemented. The cash register K3 replies with a RR message or with an RNR message (RNR=receive not ready). The RNR message serves the purpose of informing the central station Z that the transmitting location is temporarily not ready to receive further, incoming data blocks. This status is only cancelled by a RR message. The cash register K3 compares the address of which it was informed in the multiple operation instruction M to its own address. When these do not coincide, then the cash register K3 recognizes that it is to assume the role of the slave in the master-slave system of the group and sets its address in the transmission means to the address of the master K1. The procedure is the same at the cash register K2 in section c. Finally, the multiple operation instruction M is communicated to the cash register K1 that is to assume the master functions. The cash register K1 then determines that the address communicated to it coincides with its own address, this meaning that it is supposed to assume the role of the master in the data transmission. After the end of method section c, the master or, respectively, slave roles are distributed within the group and the parameters required for the data transmission such as, for example, the block length have been defined.

In section d according to FIG. 5b, the central station Z transmits a RR instruction to the cash register K3. In response thereto, the latter outputs a DM message (DM=disconnect mode) with which it reports that it is logically disconnected from the data connection to the central station Z and is in waiting mode. The same is carried out with cash register K2.

It is shown in section e that the central station Z repeatedly summons the cash registers K2 and K3 with the SNRM instruction to output data or messages according to the request operation. Since these, however, have severed their logical connection to the central station Z, there is no answer. In section e, the central station Z also transmits the start instruction S to the cash register K1. This acknowledges the reception of the start instruction ST with a RR message. With the reception of the start signal that is also received by the cash registers K2 and K3 due to the address modification (indicated by broken arrows in section e), the reception and transmission sequence counters that are valid for the cash register K1 are accepted by the cash registers K2 and K3. These block counters serve the purpose of error recognition during further transmission of the useful data.

The central station Z administers a transmission sequence counter for the useful data blocks that it transmits. Independently thereof, the cash registers K1 through K3 each respectively administer a reception sequence counter for faultlessly received useful data blocks. The transmission sequence counter then indicates the transmission sequence number of the next useful data block to be transmitted. Its value is incremented by one at every data block transmitted in normal sequence. A useful data block that is transmitted in normal sequence is accompanied by the current value of the transmission sequence counter as transmission sequence number before the transmission. The reception sequence counter indicates the reception sequence number of the useful data block to be received, this being the next to be anticipated in normal sequence. Its value is incremented by one at every faultlessly received data block. A useful data block is considered faultlessly received when the transmission sequence number thereof is identical to the current value of the reception sequence counter. The faultless data transmission to the cash registers K1 through K3 can be monitored independently of one another by setting the reception sequence counters of the cash registers K1 through K3 to the same value.

Section f schematically shows the transmission of the useful data blocks. A useful data block I (1) having the transmission sequence number 1 is transmitted from the central station Z to the cash register K1. The cash registers K2 and K3 can also receive this useful data block. However, the reception of the useful data is acknowledged only by the cash register K1. The chronological execution of the useful data transmission is thereby controlled by the RNR or, respectively, RR message. After receiving a RR message, the central station Z transmits the following useful data block I (2) having the transmission sequence number 2. When this is properly received, then the cash register K1 answers with a RR message as well as with the reception sequence number incremented by 1. This reception sequence number indicates the transmission sequence number with which the next, received useful data block is expected. The reception sequence number indicates to the central station Z that all useful data blocks having the transmission sequence numbers N up to and including N-1 have been faultlessly received.

Let it be assumed that the cash register K1 has not faultlessly received the useful data block I (3). In response thereto, the cash register K1 transmits a RR message to the central station Z whose reception sequence number has not been incremented by 1. The central station Z now recognizes that a transmission error was present and that the useful data block I (3) had not been properly transmitted. It therefore repeats the transmission of this useful data block whose proper reception by the cash register K1 is acknowledged with a RR message and with the reception sequence number incremented by 1. The reception sequence counters of the cash registers K2 and K3 work in the same way as that of the cash register K1, so that the proper reception of the data can also be determined at the cash registers K2 and K3. One can thereby see a critical advantage of the method of the present invention, for the central station Z is made aware of the transmission error in case of an error by the processing of the transmission protocol during the data transmission. Without time delay, it can immediately initiate counter measures, for example, it can repeat the faultily received useful data block.

The transmission of the useful data is continued in the manner set forth above. According to the request operation, the cash registers K2 and K3 are repeatedly summoned by the central central Z with a SNRM instruction at prescribed time intervals to output data or messages. The cash registers K2 and K3, however, do not respond to this instruction.

The last useful data block I (n) is transmitted to the cash register K1 in section g in FIG. 5c. This cash register K1 acknowledges the reception with a RR message, whereupon the central station Z transmits an end instruction to the cash register K1 with the identifier FE that the cash registers K2 and K3 also receive and interpret. As a result thereof, all cash registers recognize the end of the useful data transmission. The cash registers K2 and K3 then switch back to their original address. The end instruction, however, is only acknowledged by the cash register K1 with a RR message. When the central station Z then summons the cash register K1 according to the request operation with a RR instruction to output a message, then it aborts the transmission to the central station Z with the output of a DM message and ends this section of the transmission. Thus, after the conclusion of section g the cash registers K1, K2 and K3 have no logical data connection to the central station Z and are in a waiting condition. The central station Z can now again begin a data transmission with SNRM instructions to the cash registers K1 through K3, as had been set forth above beginning with section a.

Figure 6:
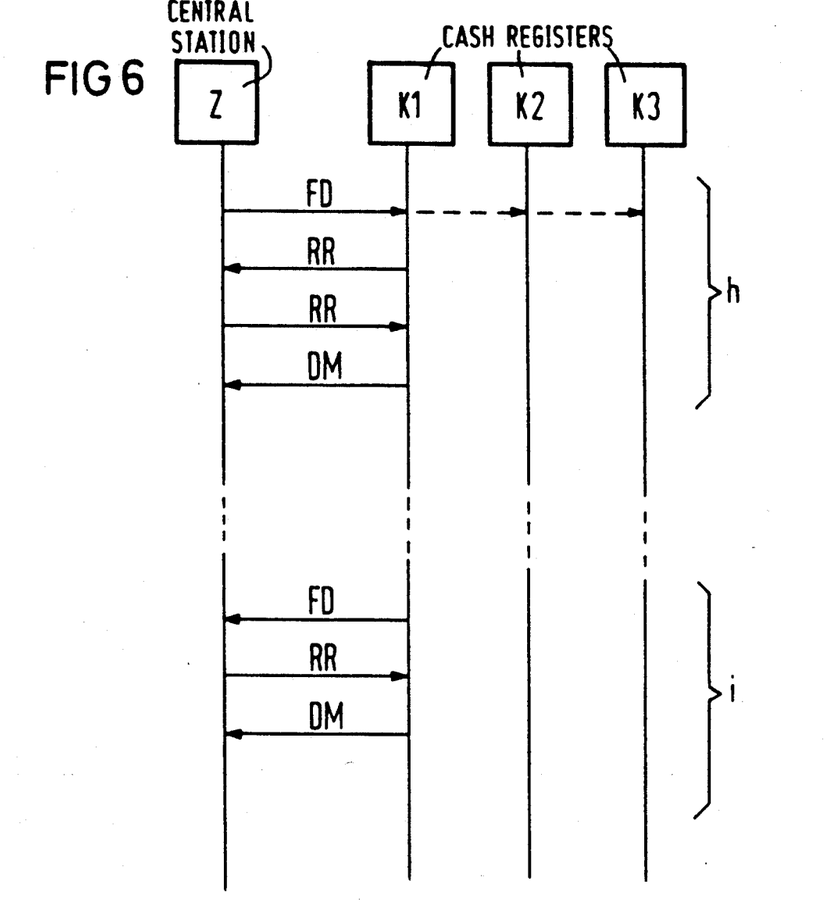
FIG. 6 depicts a flowchart wherein the executions upon abort of the data transmission by the central station or by the selected cash register is schematically shown.

The communication between the central station Z and the cash registers K1 through K3 that occurs in case of an abort of the data transmission is schematically shown in a flowchart in FIG. 6. It is assumed in section h that the central station Z initiates the abort. The cash registers K1 through K3 are in multiple operation, whereby the cash register K has the role of the master. For aborting the data transmission, the central station Z sends a FD instruction to the cash register K1 that is also received by the cash registers K2 and K3 by passive listening. The cash register K1 acknowledges the reception of the FD instruction with a RR message. In response to the reception of the RR instruction transmitted by the central station Z, the cash register K1 sends the DM instruction with which the logical connection to the central station Z is severed. After the abort of the data transmission by the central station Z, the cash registers K2 and K3 each respectively return to their original address. The section h of the transmission is thus over. The central station Z can now again set up a direct connection to the cash registers K1 through K3 and receive their requests for data transmission in order, potentially, to transmit data to them in multiple operation.

Section i shows the execution given an abort by the master, i.e. by the cash register K1. When this cash register K1 wishes an abort of the data transmission during ongoing multiple operation, then it transmits a FD instruction to the central station Z. This causes the abort of the data transmission in the central station Z. In response thereto, the central station Z transmits a RR instruction to the cash register K1, whereupon the latter returns a DM instruction to the central station Z, as a result whereof the logical connection to the latter is severed. After receiving the FD instruction, the cash registers K2 and K3 reset their address to the original address, so that the central station Z can set up a point-by-point connection to them.

Figure 7:
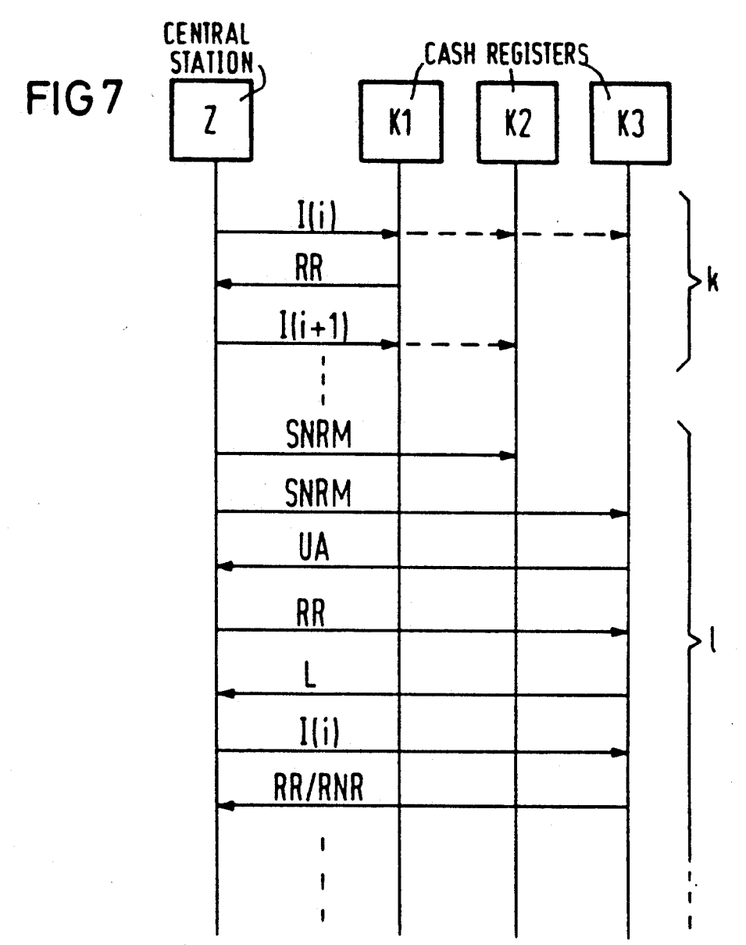
FIG. 7 depicts a flowchart wherein the system removal of a cash register after a recognized error in the data transmission is schematically shown.

FIG. 7 schematically shows the data traffic for that case wherein the cash register K3 finds a transmission error during the multiple operation. It is assumed that the error has appeared on the transmission path between the cash register K1 and the cash register K3. For example, such an error can be identified by the block check with the assistance of the reception sequence counter. After the recognition of the error, the cash register K3 removes itself from the simultaneous data transmission, i.e. it resets its address to its original address. It can thus no longer receive the data transmitted to the cash register K1 under its address. The simultaneous data transmission is then continued only for the cash registers K1 and K2, as indicated in section k by a dot-dash arrow.

When, in accordance with the request operation, the central station Z transmits a SNRM instruction to the cash register K3 in order to initiate an answerback, then the latter sends a UA message back to the central station Z. In response thereto, the central station Z transmits a RR instruction to the cash register K3. As a consequence of the faulty data transmission, the latter outputs a load instruction L to the central station Z for the data blocks that were not received. The central station Z now decides whether further cash registers have likewise output load instructions in order to potentially combine these cash registers to form a group for which a simultaneous data transmission is possible. It is assumed in the present case that such a group formation is not necessary due to a lack of demand, so that the entire useful data block sequence is transmitted to the cash register K3 via a point-to-point connection. This replies to the proper reception of the data blocks with RR or RNR messages according to the HDLC rules.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting data from a central station to a plurality of data stations via a multipoint connection according to a prescribed transmission protocol, every data station having an address allocated to it under which it receives data and also outputs messages to the central station, and at least two data stations of the plurality of data stations requesting the same data from the central station, comprising the steps of: selecting by the central station one data station of data stations that are requesting the same data and communicating the address of the selected data station from the central station to the at least one other data station of the data stations that are requesting the same data; in response thereto, modifying the address of the at least one other data station to the address of the selected data station; transmitting data from the central station to the selected data station, the transmitted data also being received by the at least one other data station whereby the transmission protocol is only processed between the central station and the selected data station during the data transmission; and resetting the address of the at least one other data station after the conclusion of the data transmission.

2. The method according to claim 1, wherein the method further comprises respectively transmitting from the data stations a load instruction to the central station for requesting data, the load instruction containing information about the capability of receiving data under a modified address.

3. The method according to claim 2, wherein the load instruction contains information about a data source and a data destination, and information about the requested data and/or information about a data block length of a reception data buffer of a respective data station.

4. The method according to claim 1, wherein the method further comprises: collecting in the central station requests for data transmitted by the data stations; forming groups of data stations from the data stations where each group of data stations is composed of data stations requesting the same data; selecting a data station for each group; and, for each group of data stations, transmitting respective requested data from the central station to the selected data station and to the other data stations in the respective group of data stations.

5. The method according to claim 4, wherein the requests for data are collected in the central station for a given time that is not greater than 10 seconds.

6. The method according to claim 4, wherein groups of data stations are formed that have the same maximum data block length of reception data buffers and the same requested data.

7. The method according to claim 1, wherein the method further comprises, before a beginning of the data transmission, transmitting from the central station a multiple operation instruction to the selected data station, as well as, to the at least one other data station, the multiple operation instruction containing the address of the selected data station, the address of the control station and a destination address.

8. The method according to claim 7, wherein, given a block-by-block transmission of the data, the multiple operation instruction contains information about a data block length of a reception buffer to which data stations participating in the data transmission are to be set, whereby the greatest common data block length of the data stations participating in the data transmission is used as the data block length in the information of the multiple operation instruction.

9. The method according to claim 7, wherein the method further comprises sending the multiple operation instruction to the selected data station last.

10. The method according to claim 7, wherein the method further comprises clearing down a communication connection between the central station and the at least on other data station after reception of the multiple operation instruction.

11. The method according to claim 1, wherein the method further comprises sending a start instruction from the central station to the selected data station at a beginning of a data transmission, the start instruction containing a current value of a block counter.

12. The method according to claim 1, wherein the method further comprises sequencing the data transmission according to an HDLC transmission protocol.

13. The method according to claim 1, wherein the method further comprises: subjecting data received at the at least one other data station to an error check; and resetting in the at least one other data station its address after recognition of an error.

14. The method according to claim 13, wherein the method further comprises retransmitting a request for data from the at least one other data station to the central station after recognition of an error.

15. The method according to claim 1, wherein the method further comprises subjecting in the selected data station received data to an error check.

16. The method according to claim wherein the method further comprises: sending an abort instruction from the selected data station to the central station for aborting the data transmission; sending a end instruction identifying the end of the data transmission from the central station to the selected data station after the reception of the abort instruction; and resetting the address of the at least one other data station.

17. The method according to claim 1, wherein the method further comprises: sending an abort instruction from the central station to the selected data station for aborting the data transmission; ending the data transmission in the selected data station; and resetting the address of the at least one other data station.

18. The method according to claim 4, wherein the data transmission is implemented according to a time-division multiplex method for a plurality of groups.

19. The method according to claim 1, wherein each data station has a respective transmission means that stores the address of the respective data station and wherein the method further comprises processing incoming data by the respective transmission means of at least one data station, the address of the at least one data station that is stored in the respective transmission means being modifiable during operation.

* * * * *